(12) United States Patent
Robertson

(10) Patent No.: US 7,357,435 B2
(45) Date of Patent: Apr. 15, 2008

(54) POWER TAILGATE ANTI-THEFT SYSTEM

(75) Inventor: Timothy H. Robertson, Allen Park, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 27 days.

(21) Appl. No.: 11/432,852

(22) Filed: May 12, 2006

(65) Prior Publication Data

US 2007/0262603 A1 Nov. 15, 2007

(51) Int. Cl.
*B62D 25/00* (2006.01)
(52) U.S. Cl. .................... 296/57.1; 296/146.4
(58) Field of Classification Search ......... 296/57.1, 296/146.4, 37.6, 50, 100.06; 49/379, 394; 224/403
See application file for complete search history.

(56) References Cited

U.S. PATENT DOCUMENTS

| | | | | |
|---|---|---|---|---|
| 1,380,229 | A * | 5/1921 | Manheim ................... 49/324 |
| 5,081,586 | A * | 1/1992 | Barthel et al. ............. 701/49 |
| 5,234,249 | A * | 8/1993 | Dorrell ..................... 296/57.1 |
| 5,448,856 | A * | 9/1995 | Moore et al. ............... 49/340 |
| 5,449,212 | A * | 9/1995 | Seifert ..................... 296/57.1 |
| 5,531,498 | A * | 7/1996 | Kowall .................... 296/146.4 |
| 5,563,483 | A * | 10/1996 | Kowall et al. ............ 318/283 |
| 5,568,120 | A * | 10/1996 | LeMense et al. ....... 340/426.28 |
| 6,068,321 | A * | 5/2000 | Ooms ...................... 296/57.1 |
| 6,137,249 | A * | 10/2000 | Butler et al. ............... 296/56 |
| 6,367,864 | B2 * | 4/2002 | Rogers et al. ............ 296/57.1 |
| 6,411,054 | B1 * | 6/2002 | Van Wiemeersch ....... 318/445 |
| 6,550,839 | B2 * | 4/2003 | Rogers et al. .............. 296/56 |
| 6,719,356 | B2 * | 4/2004 | Cleland et al. .......... 296/146.8 |
| 6,893,203 | B2 * | 5/2005 | Anderson et al. .......... 414/557 |
| 6,925,757 | B2 * | 8/2005 | Priest et al. ............... 49/360 |
| 6,994,390 | B2 * | 2/2006 | Zagoroff ................... 296/57.1 |
| 7,070,226 | B2 * | 7/2006 | Cleland et al. .......... 296/146.8 |
| 7,156,447 | B2 * | 1/2007 | Watanabe ................ 296/146.4 |
| 2003/0044266 | A1 * | 3/2003 | Vandillen et al. .......... 414/537 |
| 2006/0181108 | A1 * | 8/2006 | Cleland et al. .......... 296/146.4 |

\* cited by examiner

*Primary Examiner*—Kiran B. Patel
(74) *Attorney, Agent, or Firm*—Young Basile

(57) ABSTRACT

Disclosed herein an automotive vehicle anti-theft system for guarding against unauthorized opening of a door of the vehicle is provided, including means for selectively biasing the door of the vehicle toward a closed position, a sensor for detecting operation of the door, and a control module operably connected to the biasing means and the sensor. The control module is configured to cause the biasing means to exert a biasing force for urging the door of the vehicle toward the closed position upon receiving a signal from the sensor indicating an attempt to move the door away from the closed position toward the open position while the anti-theft system is activated.

20 Claims, 5 Drawing Sheets

POWER TAILGATE ANTI-THEFT SYSTEM

FIELD OF THE INVENTION

The present invention relates in general to an automotive vehicle having a dropdown tailgate, and more particularly, to a system for detecting and preventing unauthorized opening of the tailgate.

BACKGROUND

Conventional automotive vehicles employ doors in various forms for controlling or limiting access to various compartments within the vehicle. A vehicle may have, for example, one or more passenger doors, which when opened, allow access to the passenger compartment of the vehicle. Certain types of vehicles, such as a pick-up truck, may also include a tailgate for allowing access to a cargo area of the pick-up. There exist various devices designed to help prevent or discourage persons from gaining unauthorized access to certain compartments within the vehicle by merely opening a door. Such devices include locks and alarms, as well as other devices. Over time, such devices often become susceptible to being disabled. As a consequence it is not uncommon to have multiple security systems being used in conjunction with one another. If one security system becomes disabled, the remaining system will be active to provide the necessary security. Accordingly, there is an ongoing need to continually develop new and improved anti-theft systems capable of preventing unauthorized access to the compartments of a vehicle and which are less prone to being disabled.

SUMMARY

An automotive vehicle anti-theft system for guarding against unauthorized opening of a door of the vehicle is provided, including means for selectively biasing the door of the vehicle toward a closed position, a sensor for detecting operation of the door, and a control module operably connected to the biasing means and the sensor. The control module is configured to cause the biasing means to exert a biasing force for urging the door of the vehicle toward the closed position upon receiving a signal from the sensor indicating an attempt to move the door away from the closed position toward the open position while the anti-theft system is activated.

BRIEF DESCRIPTION OF THE DRAWINGS

The power tailgate anti-theft system disclosed herein will become more fully understood from the detailed description and accompanying drawings, wherein.

DETAILED DESCRIPTION

The following description of the embodiments is merely exemplary in nature and is in no way intended to limit the invention, its application, or uses.

Figure 1:
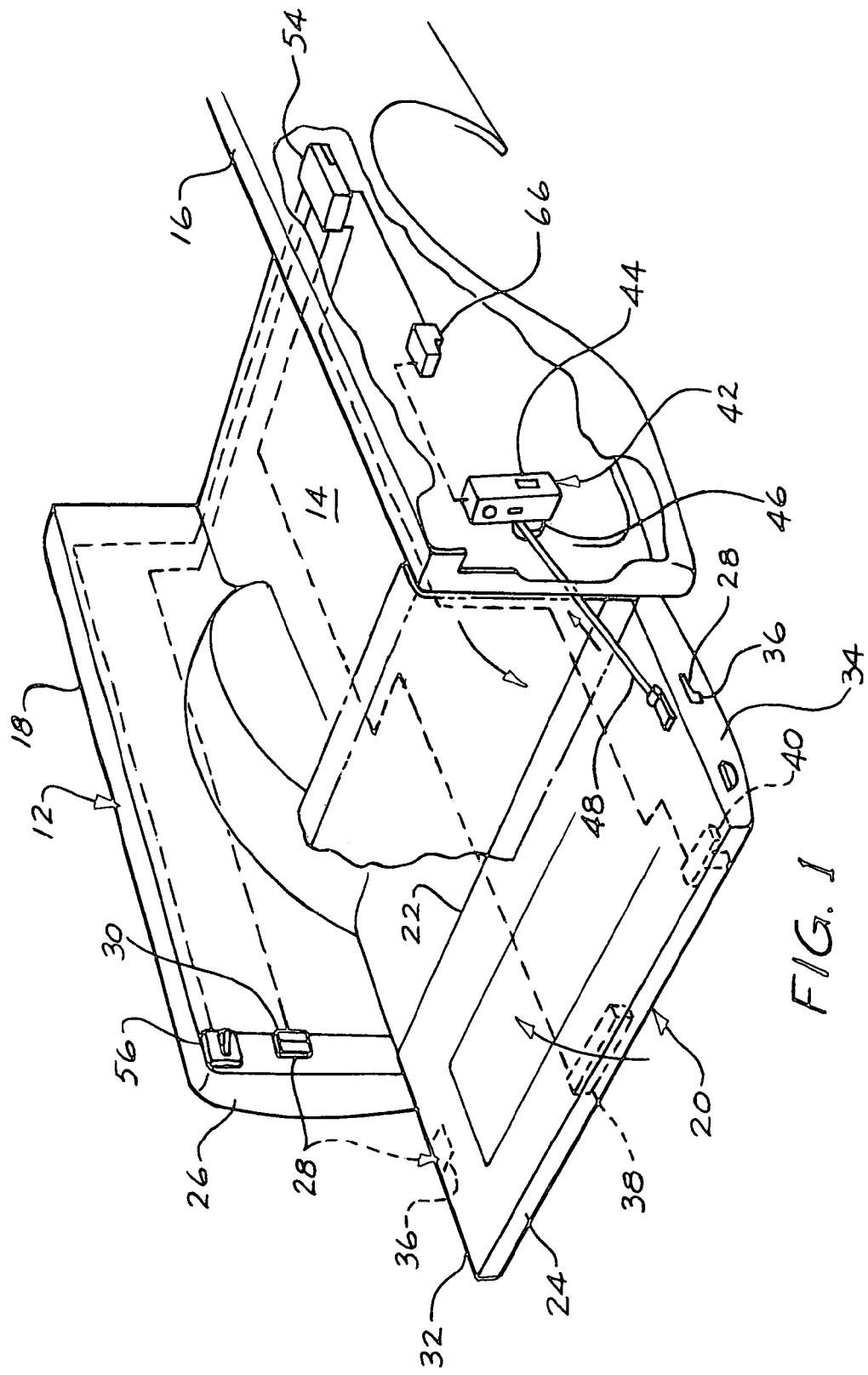
FIG. 1 is a fragmentary rear perspective view of a bed of an automotive vehicle employing a preferred embodiment of the anti-theft system disclosed herein.

Referring to FIG. 1, the anti-theft system is shown employed in an automotive vehicle 10, such as pick-up truck, having a bed 12 for transporting cargo. Bed 12 includes a horizontally orientated floor 14 on which the cargo may be placed. Extending upwardly from a right edge of floor 14 is a right side wall 16. Similarly, a left sidewall 18 extends upwardly from a left edge of floor 14. A rectangular shaped tailgate 20 defines an aft end of bed 12. It is preferable that tailgate 20 be movably attached to bed 12 to enable the tailgate to be opened to allow generally unimpeded access to the cargo area of bed 12. One method for accomplishing this is to pivotably connect a lower edge 22 of tailgate 20 to bed 12. This enables the tailgate to be pivoted about its connection to the bed between a closed position (shown in phantom in FIG. 1) and an open position, wherein an upper edge 24 of tailgate 20 is pivoted away from end 26 of bed 12. Alternatively, tailgate 20 may be moveably attached to bed 12 using any of a variety of other known attachment means, including, hinges, linkages, pins, and the like.

A latch 28 may be used to secure tailgate 20 in the closed position. Latch 28 may include a latch plate 30 fixedly attached to at least one of the sidewalls 16 and 18 of bed 12 at a location adjacent to a corresponding edge 32,34 of tailgate 20 when the tailgate is positioned in the closed position. Latch 28 may also include a corresponding clasp 36 fixedly attached to edge 32,34 of the tailgate. Tailgate 20 may be secured in the closed position by engaging clasp 36 with latch plate 30. A handle 38 may be provided for manually disengaging clasp 36 from latch plate 30. Tailgate 20 can be opened by grasping and pulling handle 38 so as to cause clasp 36 to disengage latch plate 30, thereby allowing tailgate 20 to be opened.

A locking mechanism 40 may also be provided to prevent unintended opening of tailgate 20. Locking mechanism 40 may be alternately cycled between a locked and unlocked position. Placing locking mechanism 40 in the locked position disables handle 38 and prevents the tailgate from being opened. Cycling locking mechanism 40 to the unlocked position reactivates the handle to allow tailgate 20 to be opened.

Figure 2:
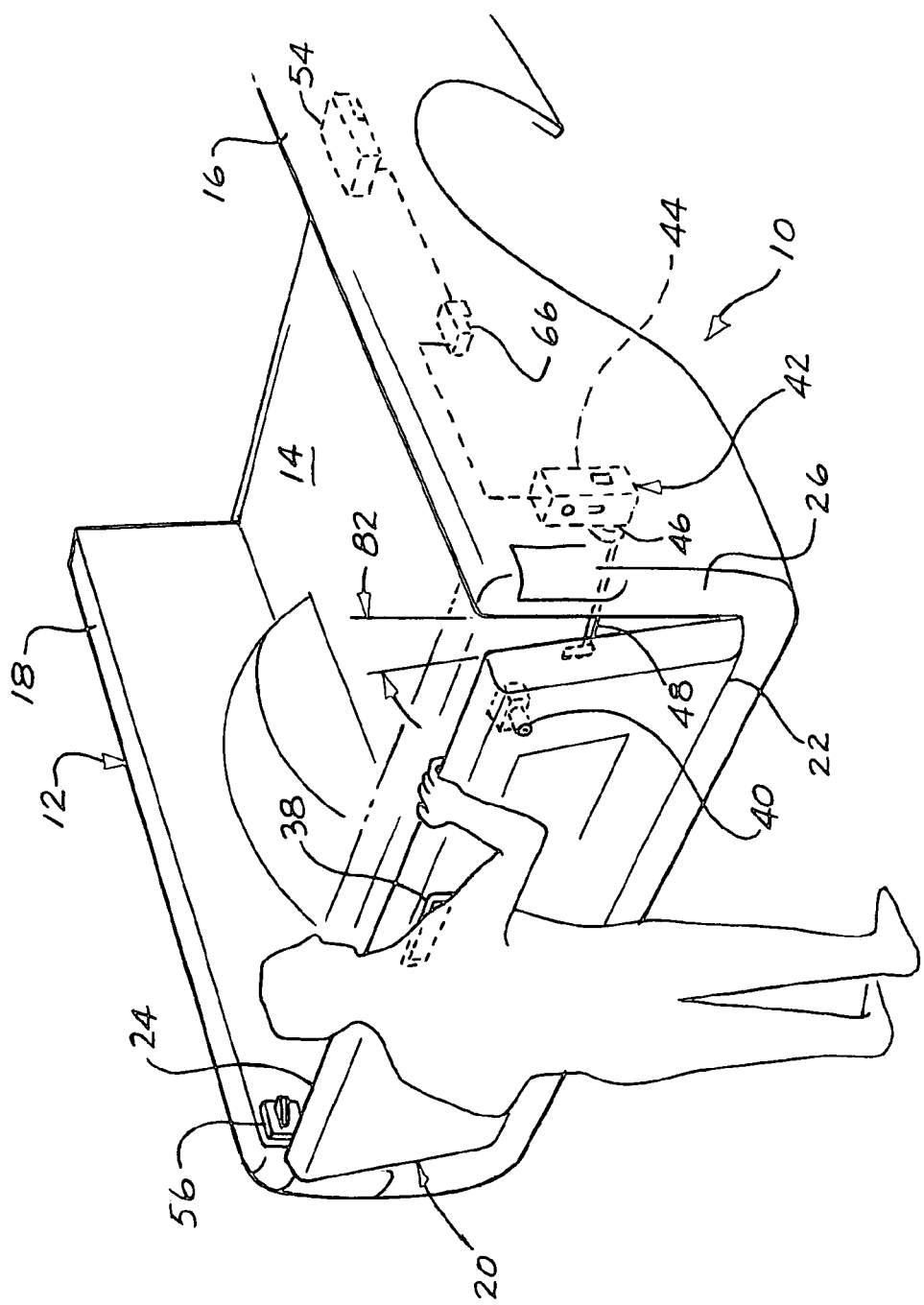
FIG. 2 is rear perspective view of the bed of the automotive vehicle showing operation of a tailgate pivotably attached to the bed.

Tailgate 20 may be manually pivoted between the open and closed positions, or alternatively, may be power actuated. An example of one such power actuator 42 is shown in FIGS. 1 and 2. Power actuator 42 includes an electric tailgate motor 44 for rotatably driving a take-up spool 46. A cable 48 has one end 50 connected to take-up spool 46 of power actuator 42, and an opposite end 52 connected to tailgate 20. Tailgate 20 can be moved from the open position to the closed position by activating tailgate motor 44, which causes cable 48 to wind onto take-up spool 46, thereby pulling tailgate 20 toward the closed position. This is just but one example of a power actuator that may be employed to automatically cycle the tailgate between the open and closed positions. It shall be appreciated that alternative power actuating devices may also be used with equally satisfactory results. Such devices may include hydraulic cylinders, pneumatic cylinders, solenoids, gears, pulleys, chains, cables, and the like.

Figure 3:
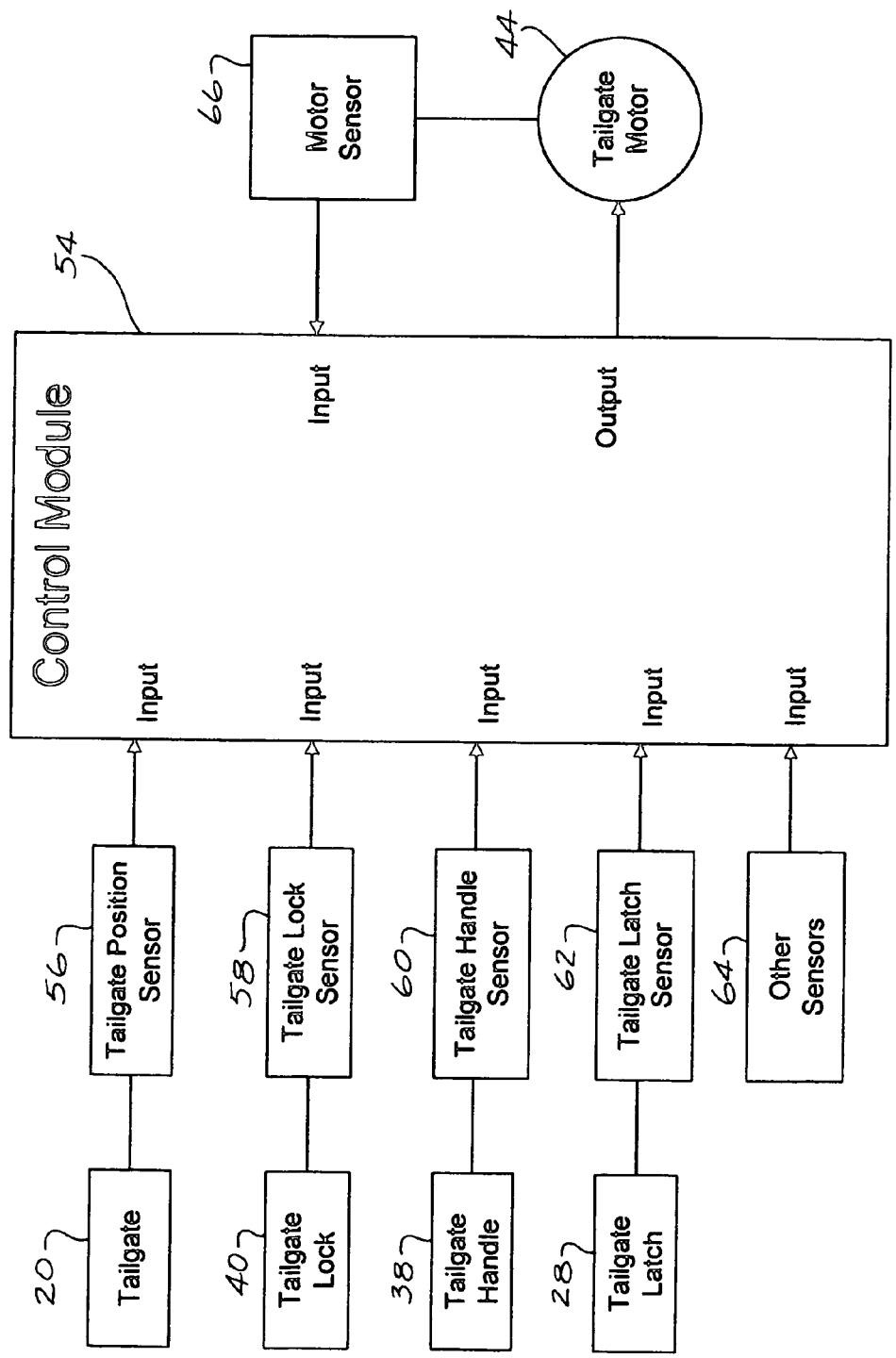
FIG. 3 is a functional block diagram of the anti-theft system of the present invention.

The anti-theft system may be operated as a standalone system or in conjunction with other security systems installed on the vehicle. When activated, the anti-theft system causes a biasing force for urging the tailgate toward the closed position to be applied to the tailgate upon detecting an unauthorized operation of the tailgate. Referring also to FIG. 3, the anti-theft system is shown to include a control module 54 for controlling operation of tailgate motor 44 based on various inputs from one or more system sensors 56-66. System sensors 56-66 are adapted to monitor various tailgate operating parameters. For example, tailgate position sensor 56 may be operably associated with tailgate 20 and configured to sense the position of tailgate 20 relative to some pre-selected position, such as the position of the tailgate in either the closed or open position, or some intermediate location. The position of tailgate 20 may also be determined using a motor sensor 66 to monitor the number of revolutions tailgate motor 44 makes as the tailgate is pivoted between the open and closed positions. Tailgate lock sensor 58 may be operably associated with tailgate lock 40 and configured to sense whether the tailgate lock is in the locked or unlocked position. Tailgate handle sensor 60 may be operably associated with tailgate handle 38 and configured to sense operation of the tailgate handle 38, such as may occur when an attempt is made to open the tailgate. Tailgate latch sensor 62 may be operably associated with latch 28 and configured to sense whether clasp 36 is engaged with latch plate 30. Although multiple tailgate operating parameters have been identified, it shall be understood that, depending on the particular application, it may not be necessary that all of the operating parameters be monitored. Rather, it may be desirable to only monitor one particular parameter, or a combination of parameters. Furthermore, it shall be appreciated that this list is not intended to be all-inclusive. There may very well be other tailgate operating parameters that could be monitored depending on the requirement of the particular application in which the anti-theft system of the present invention is being employed.

Each sensor 56-66 is operably connected to control module 54. During operation, each sensor is configured to transmit a signal to the control module indicating the status of the particular tailgate operating parameter being monitored. The control module can utilize the information received from the sensor to determine whether to initiate operation of tailgate motor 44 and begin applying a closing force to tailgate 20.

Figure 4:
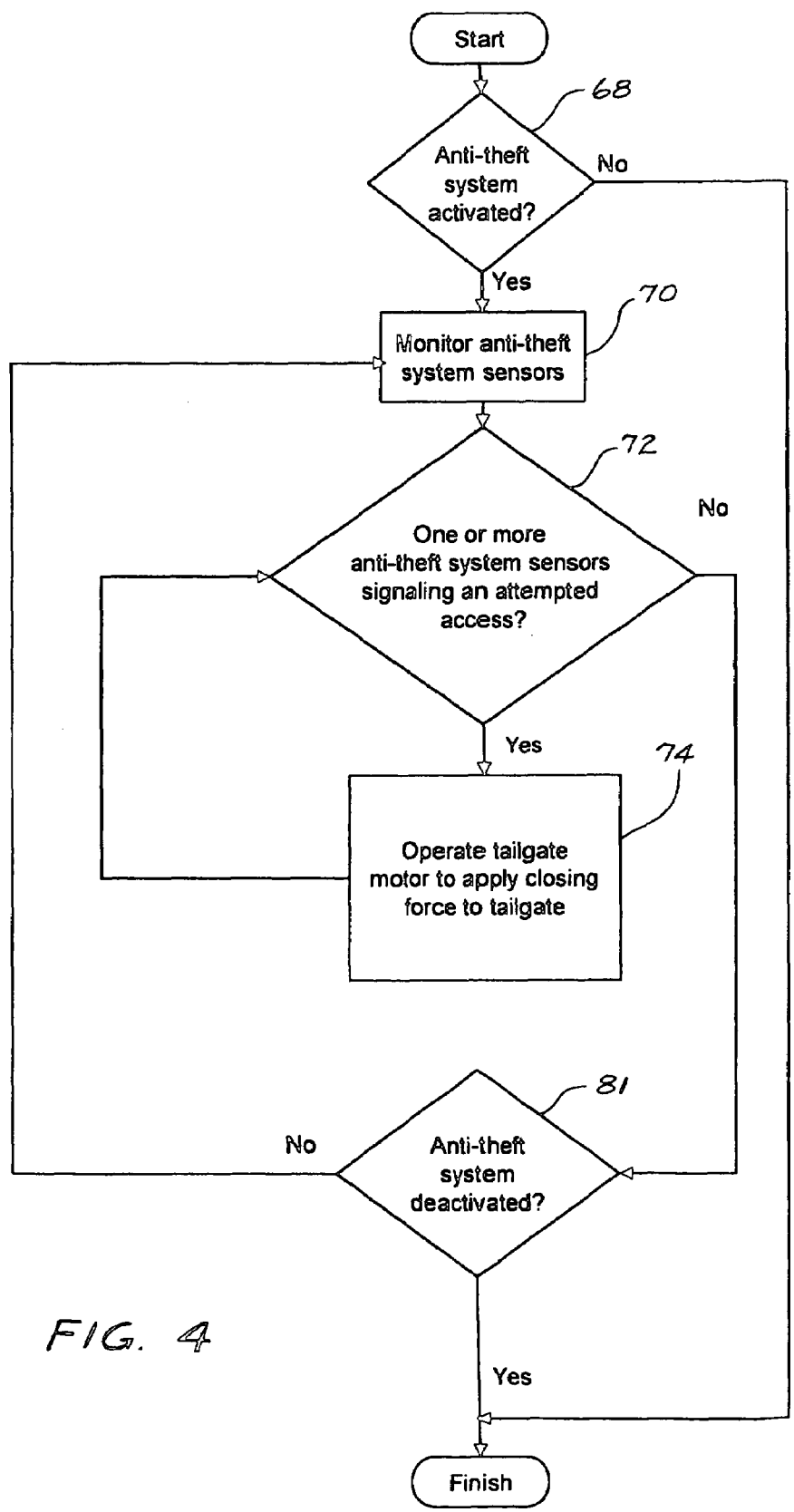
FIG. 4 is a flow chart depicting one embodiment of a method for operating the anti-theft system of the present invention.

Referring also to FIG. 4, while being operated control module 54 determines whether the anti-theft system has been activated (steps 68 and 81). If the anti-theft system has been activated, control module 54 commences monitoring the various tailgate system sensors (step 70). Control module 54 continues to monitor the system sensors until the anti-theft system is turned off. If, while monitoring the system sensors, control module 54 receives a signal from one or more of the system sensors indicating an attempt to open the tailgate (step 72), control module 54 will cause tailgate motor 44 commence applying a closing force to tailgate 20 (step 74). For example, if a person were to attempt to open tailgate 20 by pulling on tailgate handle 38, tailgate handle sensor 60 would detect the movement of the handle and send a signal to control module 54 signaling an attempt to open the tailgate. Similarly, if tailgate 20 were to be pivoted away from the closed position, tailgate position sensor 56 or motor sensor 66 would sense a change in the position of tailgate 20 and would send a corresponding signal to control module 54 notifying the control module that tailgate 20 has been moved away from the closed position. Likewise, if clasp 36 were to be separated from latch plate 30 while the anti-theft system was activated, latch sensor 62 would send a signal to control module 54 notifying the control module of the condition. Tailgate motor 54 will continue applying the closing force to tailgate 20 as long as control module 54 continues receiving a signal from one or more of the system sensors indicating an attempted opening of the tailgate. Once control module 54 stops receiving a signal indicating an attempted opening of the tailgate, control module 54 will cause tailgate motor 44 to turn off and cease applying the closing force to tailgate 20.

Figure 5:
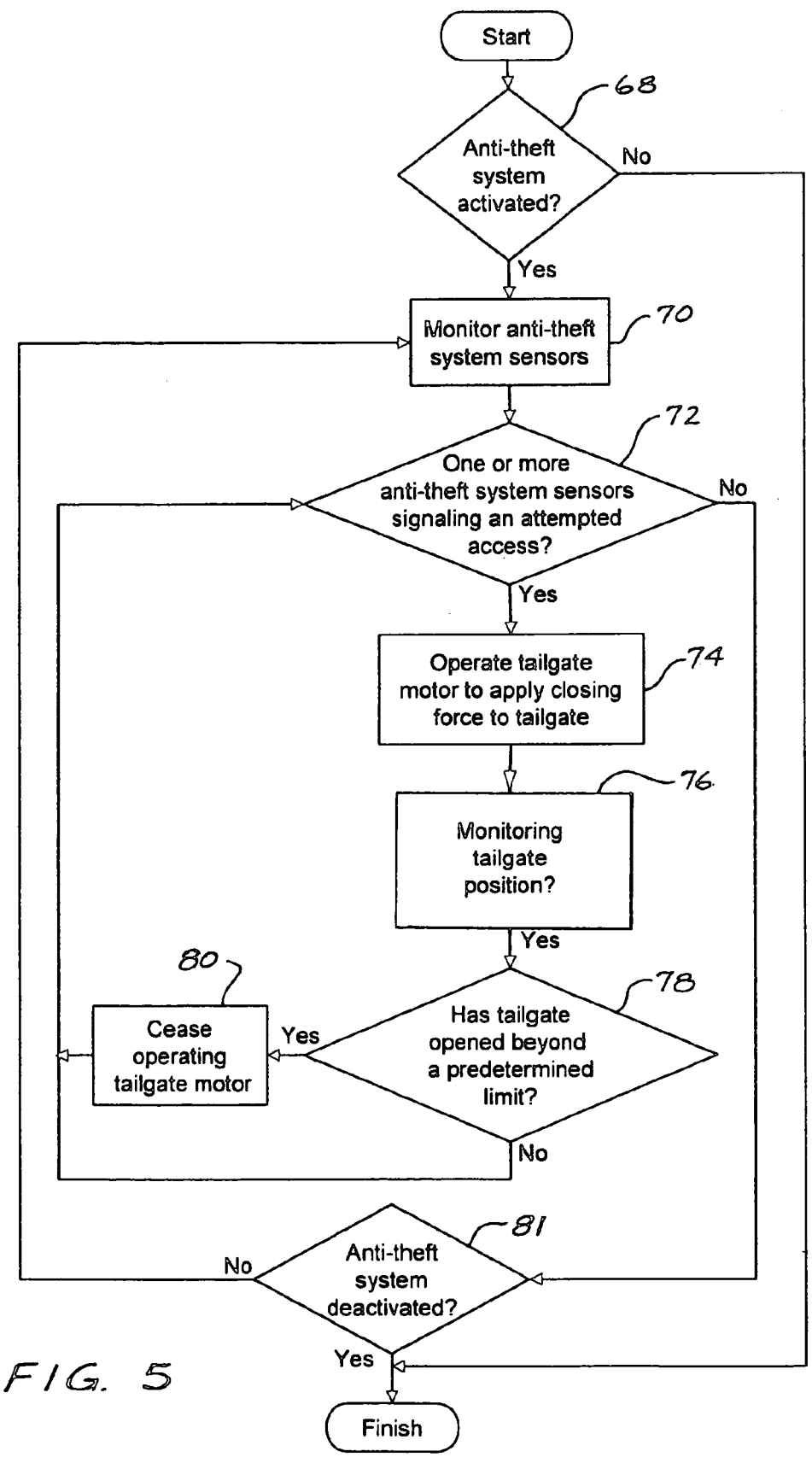
FIG. 5 is a flow chart depicting an alternate embodiment of a method for operating the anti-theft system of the present invention.

Referring also to FIGS. 2 and 5, there may be instances in which it is desirable to stop applying a closing force to tailgate 20, even though one or more system sensors continue to detect an attempted opening of the tailgate, while the anti-theft system is activated. For example, there may be instances in which the force being used to open tailgate 20 is greater than the opposing closing force being applied by tailgate motor 44. Since tailgate motor 44 would not be able to fully resist opening of the tailgate under those circumstances, it may be desirable to have the tailgate motor cease apply the closing force once the tailgate has been opened beyond a predetermined limit. In addition to monitoring tailgate position sensor 56 or motor sensor 66 to determine if tailgate 20 is in the closed position, control module 54 would also monitor the position of tailgate 20 relative to a predetermined position (step 76). Upon being notified by position sensor 56 or motor sensor 66 that tailgate 20 is positioned beyond the predetermined limit (step 78), control module 54 would cause the motor to stop applying a closing force to tailgate 20 (step 80). For example, control module 54 could cause tailgate motor 44 to cease applying a closing force to tailgate 20 once the tailgate has been pivoted a predetermined distance 82 away from the closed position.

Although the anti-theft system of the present invention is described being employed with a tailgate of pick-up truck, it shall be appreciated that the present invention may also be readily adapted to other applications, such as for preventing unauthorized opening of a vehicle passenger door and for preventing access to various other enclosures, containers, and the like. The description of the invention is merely exemplary in nature, and thus, variations that do not depart from the gist of the invention are intended to be within the scope of the invention. Such variations are not to be regarded as a departure from the spirit and scope of the invention.

What is claimed is:

1. An automotive vehicle comprising:
   a closure member moveable between a closed position and an open position;
   a sensor to detect operation of the closure member;
   a closure member actuator to selectively apply a closing force to the closure member;
   a control module in operable communication with the sensor to control operation of the closure member actuator, the control module configured to send a control signal to cause the actuator to commence applying a closing force to the closure member for urging the closure member away from the open position toward the closed position when the sensor detects operation of the closure member.

2. The automotive vehicle of claim 1, wherein the sensor comprises a position sensor operably connected to the control module to detect the position of the closure member relative to the closed position.

3. The automotive vehicle of claim 2 wherein the control module is configured to cause the closure member actuator to cease applying the closing force to the closure member when the controller determines that the closure member position relative to the closed position exceeds a predetermined value.

4. The automotive vehicle of claim 1, wherein the sensor is adapted to detect operation of an actuator, which when operated, causes the closure member to be released from the closed position.

5. The automotive vehicle of claim 1, wherein the sensor is adapted to detect movement of the closure member away from the closed position and wherein the controller is further adapted to cause the closure member actuator to stop applying the closing force to the closure member when the distance between the closure member and the closed position exceeds a predetermined limit.

6. The automotive vehicle of claim 1, wherein the sensor is adapted to detect operation of a locking mechanism, which when activated, precludes movement of the closure member away from the open position.

7. The automotive vehicle of claim 1, wherein the sensor is adapted to detect operation of a latching mechanism for retaining the closure member in the closed position.

8. The automotive vehicle of claim 1 wherein the sensor is operable to detect actuation of a handle mounted to the closure member that releases the closure member from the closed position.

9. The automotive vehicle of claim 1 wherein the closure member is a tailgate.

10. A vehicle comprising:
a closure member moveable between a closed position and an open position;
a powered actuator adapted to selectively applying a biasing force on the closure member to urge the closure member to the closed position;
a sensor adapted to detect unauthorized operation of the closure member;
a controller adapted to control the powered actuator, the controller responsive to the sensor to cause the power actuator to urge the closure member to the closed position when the sensor detects unauthorized operation of the closure member.

11. The vehicle of claim 10, wherein the powered actuator comprises an electrically powered rotational motor having a take-up spool and a cable attached to the spool and the closure member whereon rotation of the spool causes movement of the closure member.

12. The vehicle of claim 10, wherein the sensor comprises a position sensor to detect the position of the closure member relative to the closed position.

13. The vehicle of claim 12, wherein the controller is further adapted to cause the powered actuator to stop urging the closure member to the closed position when the position sensor detects that the position of the closure member relative to the closed position extends beyond a predetermined limit.

14. The vehicle of claim 12, wherein the controller is further adapted to cause the powered actuator to stop urging the closure member to the closed position when the position sensor detects that closure member is moving in opposition to the biasing force.

15. A vehicle comprising:
a closure member moveable between a closed position and an open position relative to the vehicle;
a lock adapted to secure the closure member in the closed position, the lock being cycled between a locked and unlocked position;
a sensor adapted to generate an output indicating an unauthorized manual operation of the closure member when the lock is cycled to the locked position; and
a powered actuator configured to apply a closing force to the closure member in response to a user control;
wherein the powered actuator is further adapted to apply a closing force to the closure member in response to the sensor output indicating the unauthorized manual operation of the closure member.

16. The vehicle of claim 15, wherein the sensor comprises a position sensor adapted to detect the position of the closure member relative to the closed position.

17. The vehicle of claim 15, wherein the sensor comprises a position sensor to detect the position of the closure member relative to the closed position.

18. The vehicle of claim 17, wherein the controller is further adapted to cause the powered actuator to stop urging the closure member to the closed position when the position sensor detects that the position of the closure member relative to the closed position extends beyond a predetermined limit.

19. The vehicle of claim 17, wherein the controller is further adapted to cause the powered actuator to stop urging the closure member to the closed position when the position sensor detects that closure member is moving in opposition to the biasing force.

20. The vehicle of claim 15, wherein the closure member is one of a door, tailgate and liftgate.

* * * * *